United States Patent
Kim et al.

(10) Patent No.: US 11,979,453 B2
(45) Date of Patent: May 7, 2024

(54) MICROSERVICES ARCHITECTURE BASED ROBOT CONTROL SYSTEM AND METHOD THEREOF

(71) Applicants: Hyundai Motor Company, Seoul (KR); Kia Corporation, Seoul (KR)

(72) Inventors: Ga Hee Kim, Seoul (KR); Bo Ram Kim, Incheon (KR); Gil Jin Yang, Seoul (KR); Jung Min Ryu, Gyeonggi-do (KR); Jae Hag Jung, Seoul (KR); Il Yong Yoon, Seoul (KR); Chan Mo Lim, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 179 days.

(21) Appl. No.: 17/486,333

(22) Filed: Sep. 27, 2021

(65) Prior Publication Data
US 2022/0294843 A1    Sep. 15, 2022

(30) Foreign Application Priority Data
Mar. 12, 2021   (KR) ................. 10-2021-0032847

(51) Int. Cl.
| | |
|---|---|
| H04L 29/08 | (2006.01) |
| B25J 9/16 | (2006.01) |
| B25J 11/00 | (2006.01) |
| G06V 20/20 | (2022.01) |
| H04L 9/40 | (2022.01) |
| H04L 67/025 | (2022.01) |

(52) U.S. Cl.
CPC .......... *H04L 67/025* (2013.01); *B25J 9/161* (2013.01); *B25J 11/008* (2013.01); *G06V 20/20* (2022.01); *H04L 63/0876* (2013.01)

(58) Field of Classification Search
CPC .............. H04L 67/025; H04L 63/0876; H04L 63/0892; H04L 67/12; B25J 9/161; B25J 11/008; B25J 9/16; B25J 9/1679; B25J 9/1689; B25J 9/10; B25J 9/1664; B25J 9/1694; G06V 20/20; G06Q 50/10
See application file for complete search history.

(56) References Cited

U.S. PATENT DOCUMENTS

| | | | |
|---|---|---|---|
| 2010/0145514 A1* | 6/2010 | Kim ...................... | B25J 9/161 |
| | | | 700/248 |
| 2017/0011449 A1* | 1/2017 | Mueller ............. | G06Q 30/0635 |
| 2019/0005832 A1* | 1/2019 | Waage Aabel ......... | H04N 7/147 |
| 2020/0057435 A1* | 2/2020 | Isakov ................. | G05D 1/0044 |
| 2020/0262074 A1* | 8/2020 | Proulx .................. | B25J 19/023 |

* cited by examiner

*Primary Examiner* — Phuong H Nguyen
(74) *Attorney, Agent, or Firm* — Fox Rothschild LLP

(57) ABSTRACT

A robot control system and a method may be operated in a microservices architecture (MSA)-based control environment. The robot control system includes an application programming interface (API) gateway that connects an authentication server for authenticating a robot, a management server for managing the robot, and an operation server for operating the robot in a Hyper Text Transfer Protocol (HTTP) communication method and an administrator terminal that communicates with the robot through WebRTC (Web Real-Time Communication).

9 Claims, 7 Drawing Sheets

MICROSERVICES ARCHITECTURE BASED ROBOT CONTROL SYSTEM AND METHOD THEREOF

CROSS-REFERENCE TO RELATED APPLICATION

This application claims under 35 U.S.C. § 119(a) the benefit of Korean Patent Application No. 10-2021-0032847, filed in the Korean Intellectual Property Office on Mar. 12, 2021, the entire contents of which are incorporated herein by reference.

BACKGROUND

(a) Technical Field

The present disclosure relates to a technology for monitoring and controlling a robot based on microservices architecture (MSA).

(b) Description of the Related Art

In general, MSA refers to architecture which implements one large application by dividing the one large application into several small applications to enable the change and combination of applications. When one large application is divided by specialized functions, abstraction of the application becomes possible.

For example, a service for authentication (authentication function) may perform an authentication process using an interface promised by another service. A service for 'auto-complete' in the search window may receive a user input and merely provide the result of the auto-complete, so that implementation details may be easily improved at any time while the API (Application Programming Interface) is being maintained.

MSA may facilitate deployment for each specific service without interruption of the entire service, and in particular, quickly reflect and deploy requirements. In addition, MSA has easy scalability for a specific service and a less possibility that error is likely to extend to the entire service to isolate partial error easily. In addition, MSA may solve the problem of a monolithic architecture, that is, the difficulty of precise work in an advanced program structure. For reference, the monolithic architecture is the opposite of MSA, and one service or application has one huge architecture.

A conventional robot control system monitors and controls robots based on a monolithic architecture, deteriorating the efficiency. Also, the conventional robot control system communicates with the robot based on HTTP (Hyper Text Transfer Protocol, making real-time control difficult.

The matters described in this background are prepared to enhance an understanding of the background of the present disclosure, and may include matters other than the prior art already known to those of ordinary skill in the field to which this technology belongs.

SUMMARY

An aspect of the present disclosure provides an MSA-based robot control system and a method thereof, capable of using a mixture of HTTP (Hyper Text Transfer Protocol) communication and WebRTC (Web Real-Time Communication) in controlling a robot based on microservices architecture (MSA), performing HTTP communication with a user terminal, and performing WebRTC for real-time control and monitoring to improve scalability for specific services and enable real-time control of robots.

The objects of the present disclosure are not limited to the above-mentioned objects, and other objects and advantages of the present disclosure which are not mentioned may be understood by the following description, and will be more clearly understood by embodiments of the present disclosure. It will also be readily apparent that the objects and advantages of the disclosure may be realized by means of the instrumentalities and combinations particularly pointed out in the appended claims.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a microservices architecture (MSA)-based robot control system includes an application programming interface (API) gateway that connects an authentication server for authenticating a robot, a management server for managing the robot, and an operation server for operating the robot to the robot in a Hyper Text Transfer Protocol (HTTP) communication method, and an administrator terminal that communicates with the robot through WebRTC (Web Real-Time Communication).

In an embodiment, the operation server may communicate with the robot through the WebRTC.

In an embodiment, the operation server may transmit an action constituting a service to the robot.

In an embodiment, the operation server may transmit a subsequent action when a completion signal for a previously-transmitted action is received from the robot.

In an embodiment, the action may include at least one of a move action of the robot, an elevator board and unboard action of the robot, a map change action, a hotelier or a customer authentication action, or load and unload actions of items through a tray.

In an embodiment, the administrator terminal receives and displays sensor data corresponding to the action from the robot in real time.

In an embodiment, the administrator terminal may display at least one of a location of the robot, a map, a lidar image, a camera image, log data, or an action corresponding to a service.

In an embodiment, the robot may include a first communicator connected to the API gateway in the HTTP communication method, a second communicator that communicates with the administrator terminal and the operation server through the WebRTC, and a controller that controls the first communicator to connect to the API gateway, performs an action received from the operation server, and controls the second communicator to transmit sensor data acquired in a process of preforming the action to the administrator terminal in real time.

In an embodiment, the controller may use a navigation resource, an LED resource, and a GUI resource when a move action is performed, use the navigation resource, the LED resource, and the GUI resource when an elevator board and unboard action is performed, use the navigation resource when a map change action is performed, use the LED resource and the GUI resource when a hotelier or customer authentication action is performed, and use the LED resource, the GUI resource and a tray resource when the load and unload action of an item through a tray.

According to an aspect of the present disclosure, a microservices architecture (MSA)-based robot control method includes connecting, by an application programming interface (API) gateway, an authentication server for authenticating a robot, a management server for managing the robot, and an operation server for operating the robot in a Hyper Text Transfer Protocol (HTTP) communication method, transmitting, by the operation server, an action constituting a service to the robot through WebRTC (Web Real-Time Communication), and receiving, by an administrator terminal, sensor data corresponding to the action through the WebRTC in real time, and displaying the received sensor data.

In an embodiment, the transmitting of the action constituting the service may include transmitting a subsequent action when a completion signal for a previously-transmitted action is received from the robot.

In an embodiment, the action may include at least one of a move action of the robot, an elevator board and unboard action of the robot, a map change action, a hotelier or a customer authentication action, or load and unload actions of items through a tray.

In an embodiment, the displaying of the received sensor data may include displaying at least one of a location of the robot, a map, a lidar image, a camera image, log data, and an action corresponding to a service.

According to an aspect of the present disclosure, a robot operating in a microservices architecture (MSA)-based control environment includes a first communicator connected to an API gateway in a HTTP (Hyper Text Transfer Protocol) communication method, a second communicator that communicates with an administrator terminal and an operation server through WebRTC (Web Real-Time Communication), and a controller that controls the first communicator to connect to the API gateway, performs an action received from the operation server, and controls the second communicator to transmit sensor data acquired in a process of preforming the action to the administrator terminal in real time.

In an embodiment, the second communicator may receive an action constituting a service from the operation server.

In an embodiment, the controller may control the second communicator to transmit a completion signal representing execution of the action to the operation server.

In an embodiment, the action may include at least one of a move action of the robot, an elevator board and unboard action of the robot, a map change action, a hotelier or a customer authentication action, or load and unload actions of items through a tray.

In an embodiment, the controller may use a navigation resource, an LED resource, and a GUI resource when the move action is performed, use the navigation resource, the LED resource, and the GUI resource when the elevator board and unboard action is performed, use the navigation resource when the map change action is performed, use the LED resource and the GUI resource when the hotelier or customer authentication action is performed, and use the LED resource, the GUI resource and a tray resource when the load and unload action of an item through a tray.

In an embodiment, the controller may control the second communicator to transmit, to the administrator terminal, at least one of a location of the robot, a map, a lidar image, a camera image, log data, or an action corresponding to a service.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
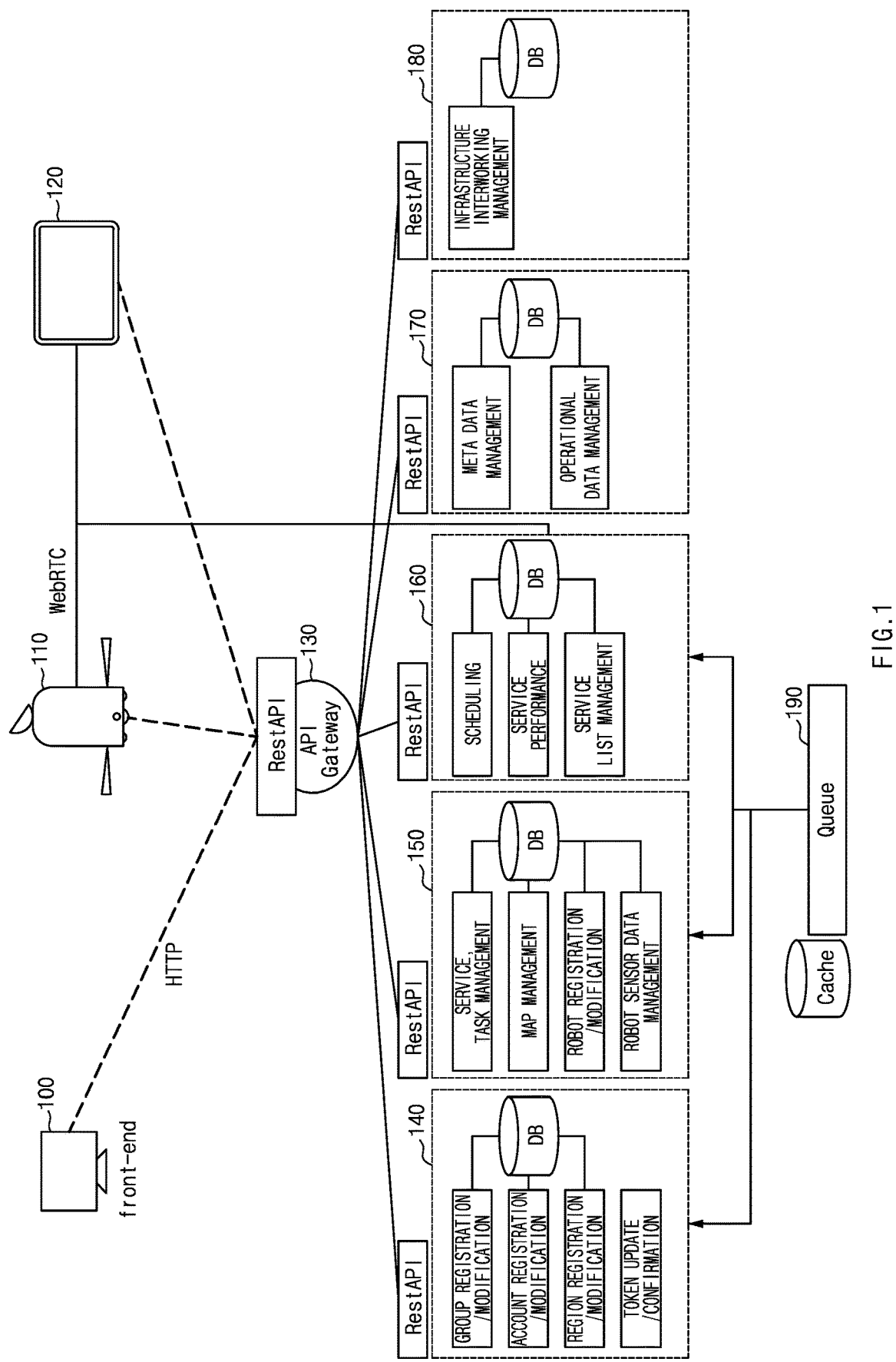
FIG. 1 is a block diagram of an MSA-based robot control system according to an embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a block diagram of an MSA-based robot control system according to an embodiment of the present disclosure.

As shown in FIG. 1, an MSA-based robot control system according to an embodiment of the present disclosure may include a user terminal 100, a robot 110, an administrator terminal 120, and an API (Application Programming Interface) gateway 130, an authentication server 140, a robot management server 150, an operation server 160, a history management server 170, an infrastructure management server 180, and a queue 190, or the like. In this case, according to a method of implementing the MSA-based robot control system according to an embodiment of the present disclosure, the components may be combined with each other as one entity, or some components may be omitted. In particular, it may be implemented that the function of the authentication server 140 is performed by the robot management server 150.

The components will be described in detail below. First, the user terminal 100 may include a smartphone, PC, notebook, iPad, Galaxy tab, or the like that can access the Internet. For example, the user terminal 100 may access the API gateway 130 in an HTTP communication manner to communicate with the robot 110 and the administrator terminal 120.

For reference, HTTP refers to a communication protocol used to transmit a hypertext document between a web server and a user's Internet browser on the Internet. In this case, the hypertext is created in such a way that a specific keyword is written in a document, and the specific keyword is cross-linked to a character or a picture, so that even different documents appear as one document.

The user terminal 100 may request a service according to a user's authority. In this case, the user's authority may be granted from the authentication server 140.

The robot 110 may include a traveling robot having a wheel, an Android robot, a drone, and the like, and in particular may have a tray capable of loading an object for use in a delivery service. In this case, the robot may automatically open and close a door of the tray, and detect the loading of an object by detecting the weight of the inside of the tray. When the loading of an object is detected, the robot may automatically close the door of the tray.

The robot 110 may include a GPS receiver, various sensors such as a LiDAR sensor, an inertial measurement unit (IMU), an ultrasonic sensor, a camera, or the like, and a plurality of communication modules to perform autonomous driving or autonomous flight. In this case, the camera may be implemented with a 2D camera or a 3D camera, and capture a surrounding image of the robot 110.

The robot 110 may communicate with the API gateway 130 through an HTTP communication method, and communicate with the administrator terminal 120 and the operation server 160 through WebRTC. For example, the robot 110 may be connected to the administrator terminal 120 and the operation server 160 in a peer to peer (P2P) method. In this case, when the robot 110 is activated first, the robot 110 may try to connect to the administrator terminal 120, and when the administrator terminal 120 is activated first, the administrator terminal 120 may try to connect to the robot 110. In addition, when the robot 110 is activated first, the robot 110 may try to connect to the operation server 160, and when the operation server 160 is activated first, the operation server 160 may try to connect to the robot 110.

For reference, WebRTC may be an API (Application Programming Interface) designed to allow web browsers to communicate with each other without the help of plug-ins. Such WebRTC may be used for voice calls, video calls, P2P file sharing, or the like. In this case, the API may be defined as an interface specification for interaction by defining a series of subprograms, protocols, and the like for creating an application program. In other words, API is an interface specification that defines functions, inputs, outputs, and data types used for software components (Function, Method, Operation, or the like) that may be used to create a program.

The administrator terminal 120 may acquire and display various data in real time from the robot 110 through WebRTC. For example, the administrator terminal 120 may display a screen as shown in FIG. 2.

Figure 2:
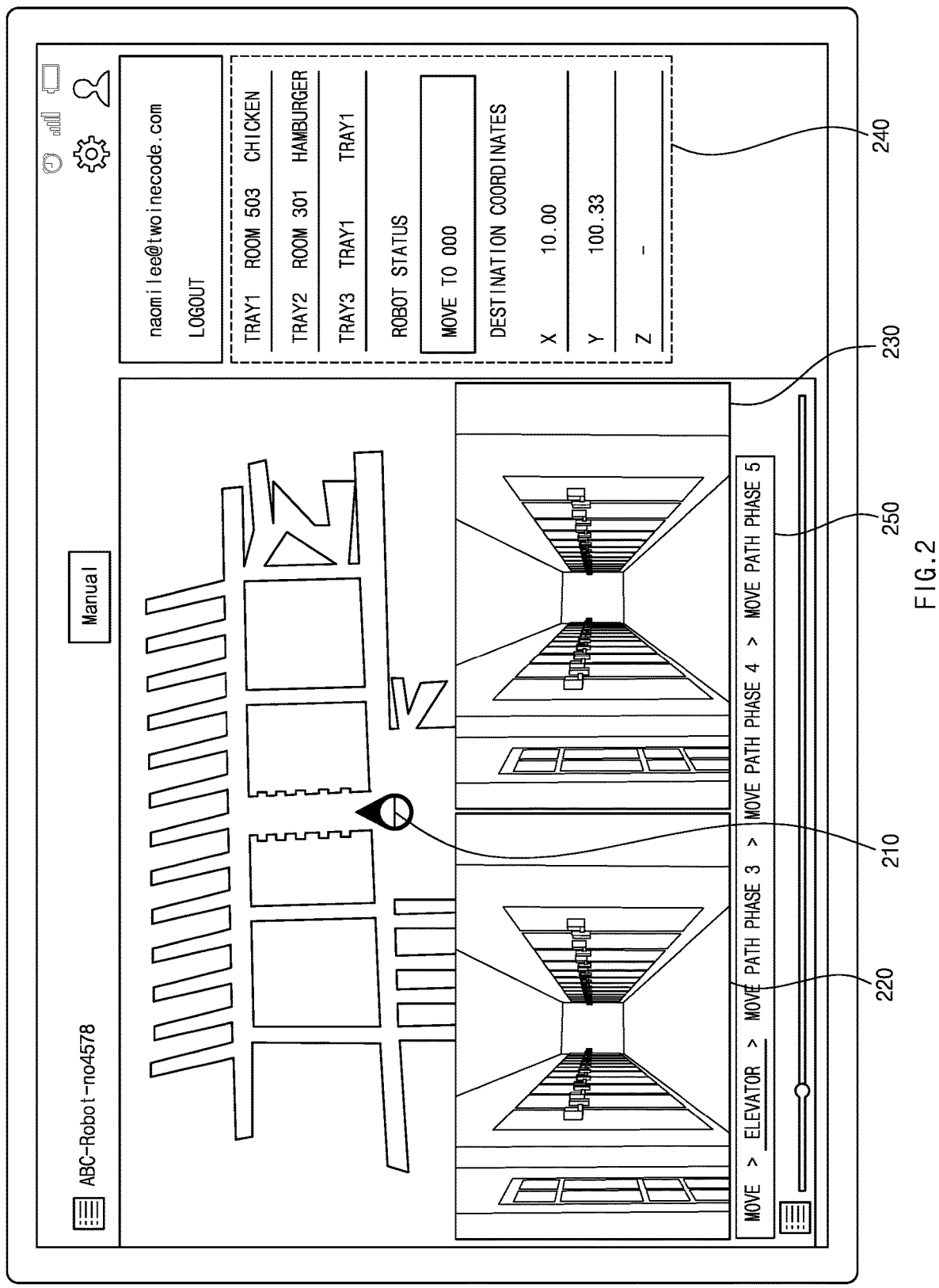
FIG. 2 is an exemplary view of a screen displayed by an administrator terminal provided in an MSA-based robot control system according to an embodiment of the present disclosure.

FIG. 2 is an exemplary view of a screen displayed by an administrator ten renal provided in an MSA-based robot control system according to an embodiment of the present disclosure.

In FIG. 2, reference numeral '210' represents the current position of the robot, reference numeral '220' represents an image captured by a camera located on the left side of the robot 110, reference numeral '230' represents an image captured by a camera located on the right side of the robot 110, reference numeral '240' represents log data, delivery information, robot status information, and so on, and reference numeral '250' represents an action (task) transmitted from the operation server 160 to the robot 110. In this case, the configuration of the action may vary according to the type of service.

FIG. 2 is a simplified screen for helping understanding, and in actual implementation, various data (e.g., a lidar image, a temperature value, battery status information, fault information, and the like) may be added in addition to the above-mentioned information (data).

On the other hand, as shown in FIG. 1, each of the API gateway 130, the authentication server 140, the robot management server 150, the operation server 160, the history management server 170, and the infrastructure management server 180 may include a REST (Representational State Transfer) API. The REST API is a service API implemented based on REST, and is an interface that enables information exchange between computer programs by providing a set of data and a function. In this case, the REST API is implemented based on the HTTP standard.

The API gateway 130 may be interconnected to the user terminal 100, the robot 110, the administrator terminal 120, the authentication server 140, the robot management server 150, the operation server 160, the history management server 170 and the infrastructure management server 180 on a network based on HTTP.

The API gateway 130 may be located at the front of the server to receive all API calls. After authenticating the received API calls, the API gateway 130 may transfer only messages corresponding to normal services. The API gateway 130 may be one of the components mentioned in the MSA, and may be a server that integrates end points for all client requests. The API gateway 130 may operate like a proxy server. In addition, additional functions such as authentication and authorization, monitoring, and logging may be provided.

For reference, unlike a monolithic architecture in which all business logics exist in a single server, in MSA, data is stored for each domain and one or more servers exist for each domain. Because there is more than one server for one service, there are a number of endpoints for a client that receives a service, so that management is difficult when an endpoint change occurs. Therefore, there is a need for the API gateway 130 capable of integrating services into one in an MSA environment.

Meanwhile, each of the authentication server 140, the robot management server 150, the operation server 160, the history management server 170, and the infrastructure management server 180 may include database (DB). In this case, the DB may include Mongo DB as an example. Here, the Mongo DB may store data in the form of BSON (Binary JSON) documents, thereby making it possible to facilitate distributed storage and extension onto multiple servers, and achieving efficiency in processing a large amount of data.

The authentication server 140 is a server that authenticates the robot 110 and the user terminal 100, and may perform group registration and modification, account registration and modification, region registration and modification, token update and confirmation, and the like.

For reference, a token is an object or device used for access management of a security object, and may be classified into an access token, a security token, a session token, and the like. Here, the access token, which is the most commonly used token form, is used for a system or software to grant authority to a target which accesses a certain function or data. The access token may be usually composed of a character string in the form of a random number. For example, a web service provider may prevent leakage of personal information and provide a safe service by issuing an access token created using information such as a user's ID, password, or credit card to a user in the case of access. The security token is a hardware storage device and may control an authority to use limited resources of a specific electronic device. For example, there is a USB security token. The session token may be an object assigned by an Internet server to a client for data exchange after the Internet server is connected to a client through HTTP communication.

The robot management server 150 is a server that manages the robot 110, may perform service and task (action) management, map management, registration and modification of the robot 110, management of data sensed by various sensors provided in the robot, and the like.

Figure 3:
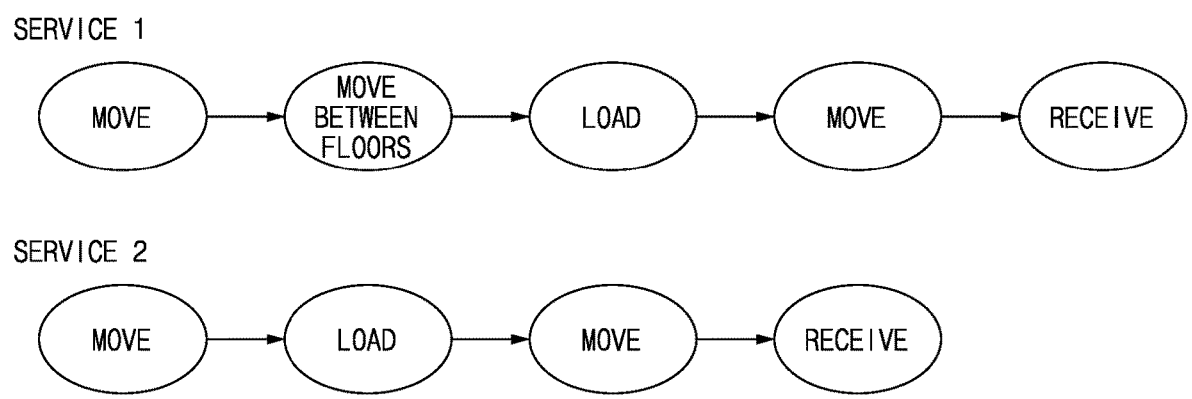
FIG. 3 is an exemplary diagram of a service managed by a management server provided in an MSA-based robot control system according to an embodiment of the present disclosure.

FIG. 3 is an exemplary diagram of a service managed by a management server provided in an MSA-based robot control system according to an embodiment of the present disclosure.

As shown in FIG. 3, both service 1 and service 2 may be related to delivery services, and service 1 may include move, move between floors, load, move, and receive as actions, and service 2 may include move, load, move, and receive as actions. In this case, service 1 may be applied when a loading place is located on a different floor, and service 2 may be applied when the loading place is located on the same floor.

The operation server 160 is a server that operates the robot 110 and may perform scheduling, service execution, and service list management.

The operation server 160 may transmit one action to the robot 110, and when a completion signal for the action is received from the robot 110, transmit a subsequent action to the robot 110. For reference, one service may be composed of a plurality of actions, and each action may be a semantic action with a structure such as [<action>, <start/end/pause/resume/restart>, <factor>].

The history management server 170 and the infrastructure management server 180 may be additional components of the present disclosure. The history management server 170 may manage meta data and operation data related to the robot 110, and the infrastructure management server 180 may manage interworking with infrastructure related to the robot 110.

The queue 190 may store and transmit messages transmitted and received between the authentication server 140, the robot management server 150, and the operation server 160. The queue 190 may include, for example, a message queue.

Figure 4:
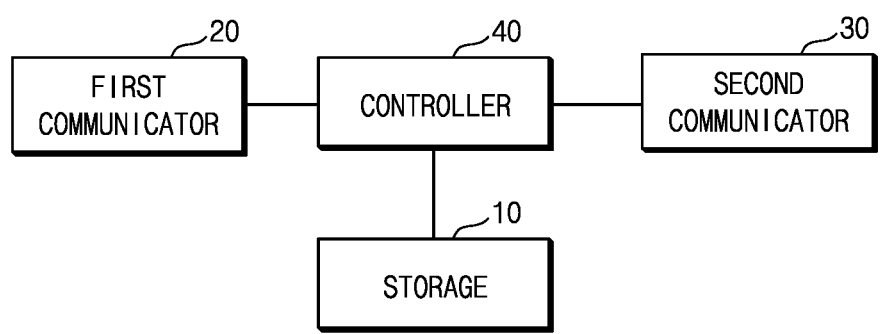
FIG. 4 is a block diagram of a robot provided in an MSA-based robot control system according to an embodiment of the present disclosure.

FIG. 4 is a block diagram of a robot provided in an MSA-based robot control system according to an embodiment of the present disclosure.

Referring to FIG. 4, the robot 110 provided in the MSA-based robot control system according to an embodiment of the present disclosure may include storage 10, a first communicator 20, a second communicator 30, and a controller 40. In this case, according to a method of implementing a robot provided in the MSA-based robot control system according to an embodiment of the present disclosure, the components may be combined with each other as one entity, or some components may be omitted.

The components will be described below. First, in an MSA-based control environment, the storage 10 may store various logics, algorithms, and programs required in the process of accessing to the API gateway 130 in a first communication method (e.g., HTTP communication) and transmitting sensor data to the administrator terminal 120 based on a second communication method (e.g., WebRTC). Here, the sensor data may refer to data acquired through various sensors mounted on the robot 110 during the operation of the robot 110.

The storage 10 may store an action list for each service. As an example, the action list for the delivery service is shown in Table 1 below.

TABLE 1

| No. | ID | Type | Model name | Nation | Region | Company | workplace |
|---|---|---|---|---|---|---|---|
| 1 | MOVE | NR-MOBILE | H2D2 | KOR | A | Hyundai | H1 |
| 2 | LOAD | NR-MOBILE | H2D2 | KOR | A | Hyundai | H1 |
| 3 | arrivalFloorElev | NR-MOBILE | H2D2 | KOR | A | Hyundai | H1 |
| 4 | callElev | NR-MOBILE | H2D2 | KOR | A | Hyundai | H1 |
| 5 | cerrifiaeCustomer | NR-MOBILE | H2D2 | KOR | A | Hyundai | H1 |
| 6 | certificateHotelier | NR-MOBILE | H2D2 | KOR | A | Hyundai | H1 |
| 7 | downloadMAp | NR-MOBILE | H2D2 | KOR | A | Hyundai | H1 |

The storage 10 may include at least one type of storage medium of a flash memory type, a hard disk type, a micro type, and a card type (e.g., an Secure Digital Card (SD card) or an eXtream Digital card (XD card)) of memory, a Random Access Memory (RAM), a Static RAM (SRAM), a Read-Only Memory (ROM), a Programmable ROM (PROM), an Electrically Erasable PROM (EEPROM), a Magnetic Memory (MRAM), a magnetic disk, and an optical disk type of memory.

The first communicator 20 may be connected to the API gateway 130 in the HTTP (Hyper Text Transfer Protocol) communication method to communicate with the authentication server 140, the management server 150, the operation server 160, the history management server 170, and the infrastructure management server 180 individually.

The second communicator 30 may transmit sensor data to the administrator tem final 120 through Web Real-Time Communication (WebRTC).

The controller 40 may perform overall control such that each of the above components normally performs its function. The controller 40 may be implemented in the form of hardware or software, or may be implemented in a combination of hardware and software. Preferably, the controller 40 may be implemented with a microprocessor, but is not limited thereto.

In particular, the controller 40 may perform various controls in a process of accessing the API gateway 130 in a first communication method (e.g., HTTP communication) and transmitting sensor data to the administrator terminal 120 based on a second communication method (e.g., WebRTC) in an MSA-based robot control environment.

The controller 40 may verify validity of the command received from the operation server 160 or the administrator terminal 120 based on the action list for each service stored in the storage 10, and perform the command when the validity is verified. In this case, the command may have a structure such as [<action>, <start/end/pause/resume/restart>, <factor>], and may verify the validity of the command by determining whether the action contained in the command is an action recorded in the action list.

Hereinafter, the operation of the controller 40 will be described in detail with reference to FIG. 5.

Figure 5:
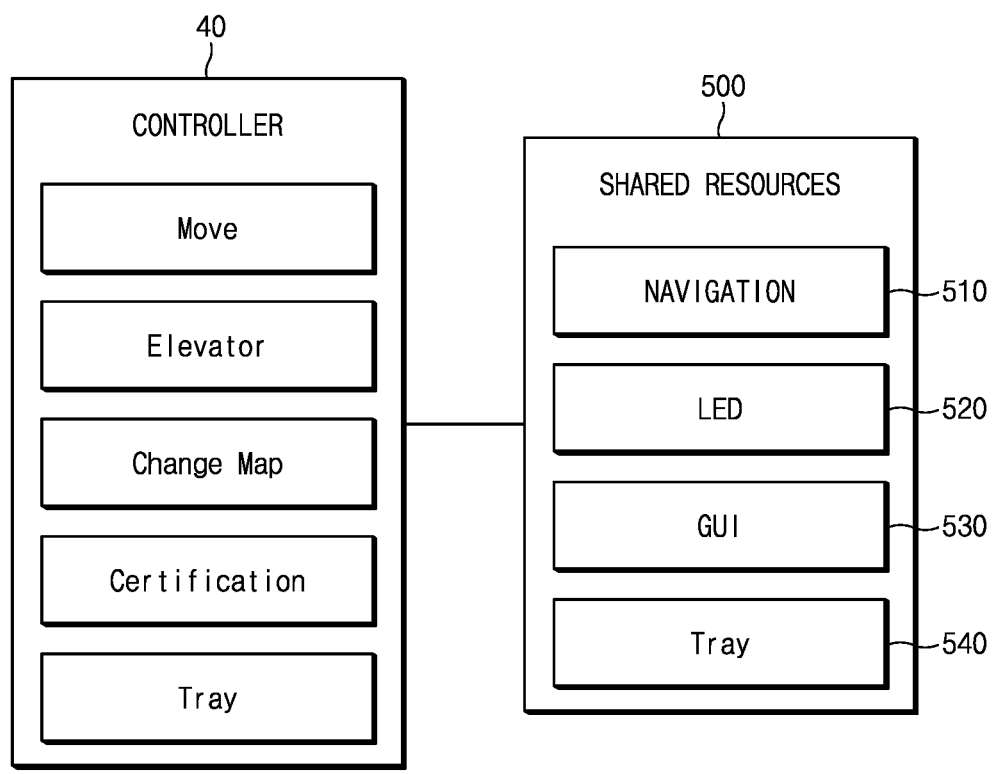
FIG. 5 is an exemplary view showing an operation of a controller provided in a robot in an MSA-based robot control system according to an embodiment of the present disclosure.

FIG. 5 is an exemplary view showing an operation of a controller provided in a robot in an MSA-based robot control system according to an embodiment of the present disclosure.

Referring to FIG. 5, the controller 40 provided in the robot 110 in the MSA-based robot control system according to an embodiment of the present disclosure may perform a move action, an elevator board and unboard action, change map action, a hotelier or customer certification action, and load and unload actions of items through a tray when preforming a delivery service, for example. In this case, the controller 40 may manage various shared resources 500 to perform the action (function).

For example, the controller 40 may use a navigation 510 resource, a light-emitting diode (LED) 520 resource, and a graphical user interface (GUI) 530 resource among the shared resources 500 to perform the move action. In addition, the controller 40 may use the navigation 510 resource, the LED 520 resource, and the GUI 530 resource among the shared resources 500 to perform the elevator board and unboard action.

As another example, the controller 40 may use the navigation 510 resource among the shared resources 500 to perform the map change action.

As another example, the controller 40 may use the LED 520 resource and the GUI 530 resource among the shared resources 500 to perform the hotelier or customer authentication action. That is, the controller 40 may use the LED 520 resource and the GUI 530 resource for interaction with the user.

As another example, the controller 40 may use the LED 520 resource, the GUI 530 resource, and the tray 540 resource among the shared resources 500 to perform the load and unload actions of items through trays. That is, the controller 40 may use the tray 540 resource to release a door lock of the tray or open and close a door for the load and unload actions of items. In addition, the controller 40 may use the LED 520 resource and the GUI 530 resource to give a feedback to the user.

Figure 6:
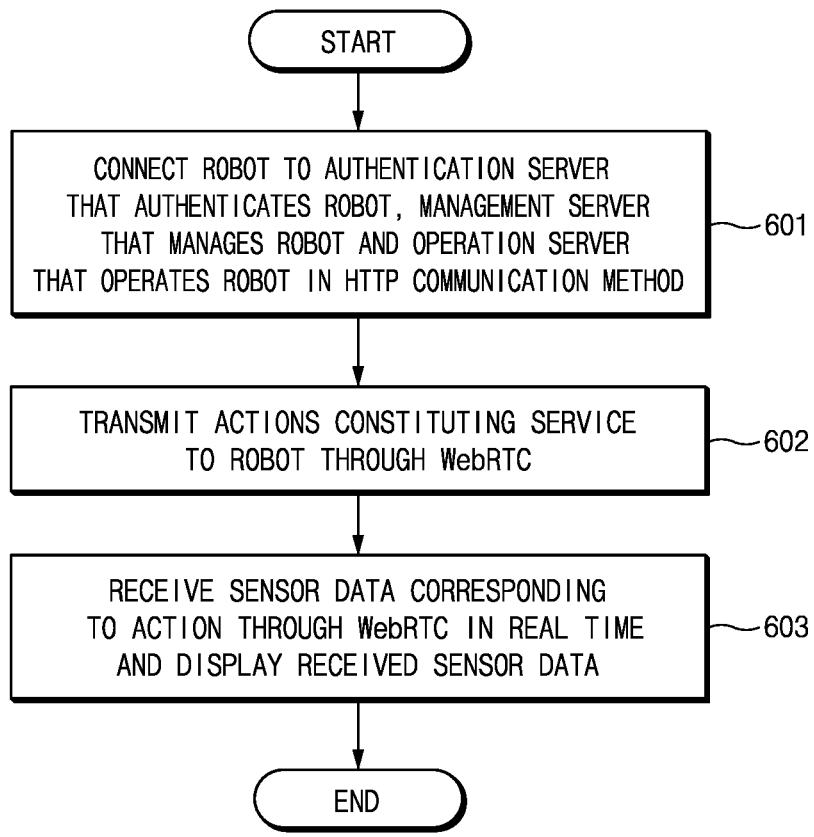
FIG. 6 is a flowchart of an MSA-based robot control method according to an embodiment of the present disclosure.

FIG. 6 is a flowchart of an MSA-based robot control method according to an embodiment of the present disclosure.

First, the API gateway 130 may connect the authentication server 140 that authenticates the robot, the management server 150 that manages the robot, and the operation server 160 that operates the robot to the robot 110 in an HTTP communication method (601).

Then, the operation server 160 may transmit actions constituting a service to the robot 110 through WebRTC (602).

Thereafter, the administrator terminal 120 may receive sensor data corresponding to the actions through the WebRTC in real time, and display the received sensor data (603).

Figure 7:
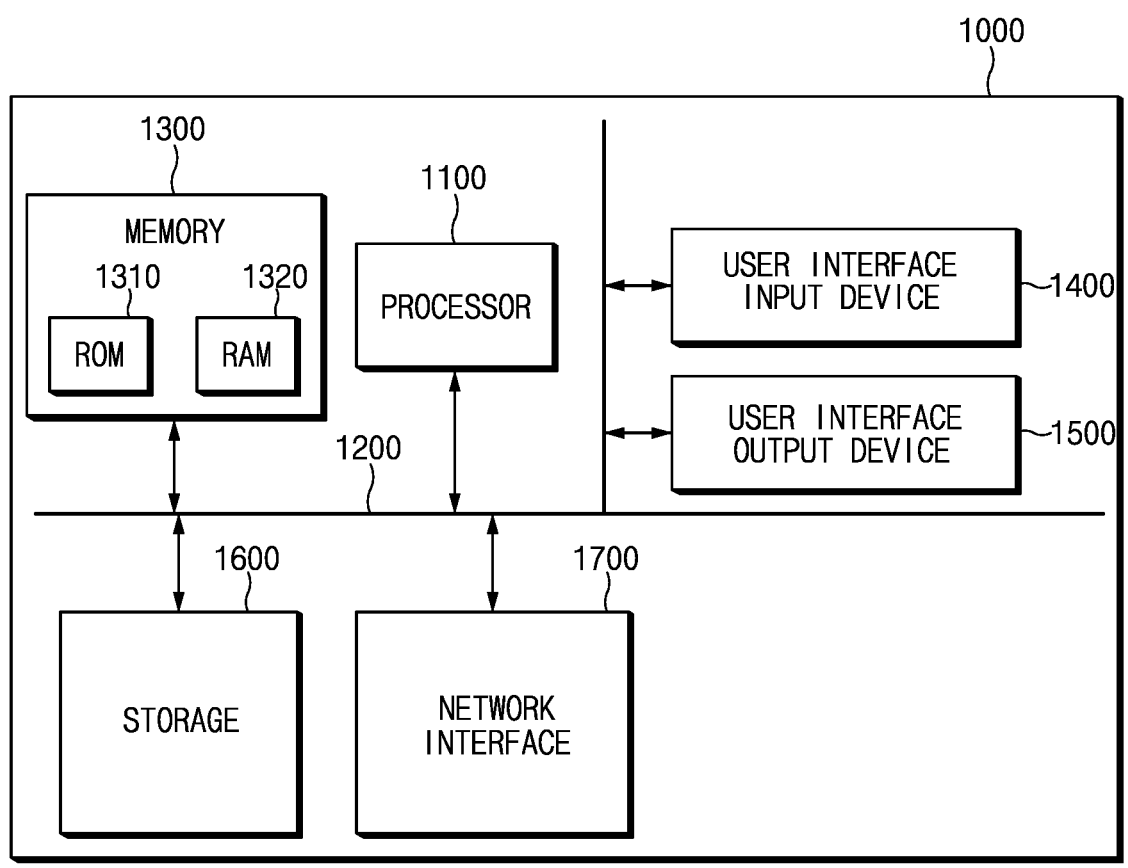
FIG. 7 is a diagram illustrating a computing system for performing an MSA-based robot control method according to an embodiment of the present disclosure.

FIG. 7 is a diagram illustrating a computing system for performing an MSA-based robot control method according to an embodiment of the present disclosure.

Referring to FIG. 7, an MSA-based robot control method according to an embodiment of the present disclosure as described above may be also implemented through a computing system. A computing system 1000 may include at least one processor 1100, a memory 1300, a user interface input device 1400, a user interface output device 1500, storage 1600, and a network interface 1700, which are connected with each other via a system bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a solid state drive (SSD) a removable disk, and a CD-ROM. The exemplary storage medium may be coupled to the processor 1100, and the processor 1100 may read information out of the storage medium and may record information in the storage medium. Alternatively, the storage medium may be integrated with the processor 1100. The processor 1100 and the storage medium may reside in an application specific integrated circuit (ASIC). The ASIC may reside within a user terminal. In another case, the processor 1100 and the storage medium may reside in the user terminal as separate components.

The above description is merely illustrative of the technical idea of the present disclosure, and various modifications and variations may be made without departing from the essential characteristics of the present disclosure by those skilled in the art to which the present disclosure pertains.

Therefore, the exemplary embodiments of the present disclosure are provided to explain the spirit and scope of the present disclosure, but not to limit them, so that the spirit and scope of the present disclosure is not limited by the embodiments. The scope of protection of the present disclosure should be interpreted by the following claims, and all technical ideas within the scope equivalent thereto should be construed as being included in the scope of the present disclosure.

The MSA-based robot control system and the method thereof according to an embodiment of the present disclosure may use a mixture of HTTP (Hyper Text Transfer Protocol) communication and WebRTC (Web Real-Time Communication) in controlling a robot based on microservices architecture (MSA), performing HTTP communication with a user terminal, and performing WebRTC for real-time control and monitoring to improve scalability for specific services and enable real-time control of robots.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A robot control system comprising:
    an authentication server configured to authenticate a robot;
    a management server configured to manage the robot;
    an operation server configured to operate the robot;
    an application programming interface (API) gateway configured to connect the authentication server, the management server, and the operation server to the robot in a Hyper Text Transfer Protocol (HTTP) communication method;
    a representational state transfer (REST) API, the REST API configured to enable information exchange between the API gateway, the authentication server, the management server, and the operation server; and
    an administrator terminal configured to communicate with the robot through WebRTC (Web Real-Time Communication),
    wherein the operation server transmits an action constituting a service to the robot,
    wherein the action includes at least one of a move action of the robot, an elevator board and unboard action of the robot, a map change action, a hotelier or a customer authentication action, or load and unload actions of items through a tray, and
    wherein the controller is configured to use a navigation resource, an LED resource, and a GUI resource when the move action is performed, use the navigation resource, the LED resource, and the GUI resource when the elevator board and unboard action is performed, use the navigation resource when the map change action is performed, use the LED resource and the GUI resource when the hotelier or the customer authentication action is performed, or use the LED resource, the GUI resource and a tray resource when performing the load and unload actions of the items through the tray.

2. The robot control system of claim 1, wherein the operation server transmits a subsequent action when a completion signal for a previously-transmitted action is received from the robot.

3. The robot control system of claim 1, wherein the administrator terminal receives and displays sensor data corresponding to the action from the robot in real time.

4. The robot control system of claim 3, wherein the administrator terminal displays at least one of a location of the robot, a map, a lidar image, a camera image, log data, or an action corresponding to a service.

5. The robot control system of claim 1, wherein the robot includes:
    a first communicator connected to the API gateway in the HTTP communication method;
    a second communicator configured to communicate with the administrator terminal and the operation server through the WebRTC; and
    a controller configured to control the first communicator to connect to the API gateway, perform an action received from the operation server, and control the second communicator to transmit sensor data acquired in a process of preforming the action to the administrator terminal in real time.

6. The robot control system of claim 1, wherein the robot is operated in a microservices architecture (MSA)-based control environment.

7. A robot operating in a microservices architecture (MSA)-based control environment, the robot comprising:
    a first communicator connected to an API gateway in a HTTP (Hyper Text Transfer Protocol) communication method;
    a second communicator configured to communicate with an administrator terminal and an operation server through WebRTC (Web Real-Time Communication);
    a controller configured to control the first communicator to connect to the API gateway, perform an action received from the operation server, and control the second communicator to transmit sensor data acquired in a process of preforming the action to the administrator terminal in real time; and a representational state transfer (REST) API, the REST API configured to enable information exchange between the API gateway and the operation server,
wherein the second communicator receives an action constituting a service from the operation server,
wherein the action includes at least one of a move action of the robot, an elevator board and unboard action of the robot, a map change action, a hotelier or a customer authentication action, or load and unload actions of items through a tray, and
wherein the controller is configured to use a navigation resource, an LED resource, and a GUI resource when the move action is performed, use the navigation resource, the LED resource, and the GUI resource when the elevator board and unboard action is performed, use the navigation resource when the map change action is performed, use the LED resource and the GUI resource when the hotelier or the customer authentication action is performed, or use the LED resource, the GUI resource and a tray resource when performing the load and unload actions of the items through the tray.

8. The robot of claim 7, wherein the controller is configured to control the second communicator to transmit a completion signal representing execution of the action to the operation server.

9. The robot of claim 7, wherein the controller is configured to control the second communicator to transmit, to the administrator terminal, at least one of a location of the robot, a map, a lidar image, a camera image, log data, or an action corresponding to a service.

* * * * *